United States Patent
Hayashi

(10) Patent No.: US 7,274,952 B2
(45) Date of Patent: Sep. 25, 2007

(54) PORTABLE TELEPHONE SET

(75) Inventor: Yuka Hayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 480 days.

(21) Appl. No.: 10/635,667

(22) Filed: Aug. 7, 2003

(65) Prior Publication Data

US 2004/0046745 A1 Mar. 11, 2004

(30) Foreign Application Priority Data

Aug. 19, 2002 (JP) .............. 2002-238580

(51) Int. Cl.
*H04M 1/00* (2006.01)

(52) U.S. Cl. .......... 455/575.1; 455/90.1; 455/344; 455/346; 348/333.05

(58) Field of Classification Search ........ 455/556.1, 455/556.2, 557, 575.1, 550.1, 90.1, 575.9, 455/575.8, 575.3, 575.4, 575.5, 575.6, 90.2, 455/90.3, 566, 344, 345, 346; 348/333.05, 348/231.2, 333.11, 222.1; 345/59
See application file for complete search history.

(56) References Cited

U.S. PATENT DOCUMENTS

| | | | | | |
|---|---|---|---|---|---|
| 5,155,774 | A | * | 10/1992 | Numagami | ............. 348/333.05 |
| 5,606,365 | A | * | 2/1997 | Maurinus et al. | ......... 348/222.1 |
| 5,828,355 | A | * | 10/1998 | Comeau et al. | ............... 345/59 |
| 5,926,218 | A | * | 7/1999 | Smith | ................... 348/333.11 |
| 6,122,521 | A | * | 9/2000 | Wilkinson et al. | .......... 455/457 |
| 6,317,609 | B1 | * | 11/2001 | Alperovich et al. | ..... 455/556.1 |
| 6,522,889 | B1 | * | 2/2003 | Aarnio | ....................... 455/457 |
| 6,538,698 | B1 | * | 3/2003 | Anderson | .............. 348/333.05 |
| 6,564,070 | B1 | * | 5/2003 | Nagamine et al. | .......... 455/344 |
| 6,694,133 | B1 | * | 2/2004 | Tobita et al. | ................ 455/566 |
| 6,795,715 | B1 | * | 9/2004 | Kubo et al. | ................ 455/90.1 |
| 6,915,119 | B1 | * | 7/2005 | Konishi | ....................... 455/566 |
| 2002/0058536 | A1 | * | 5/2002 | Horii et al. | ................. 455/575 |
| 2002/0104884 | A1 | | 8/2002 | Meier et al. | |

(Continued)

FOREIGN PATENT DOCUMENTS

DE 201 06 609 6/2001

(Continued)

OTHER PUBLICATIONS

Great Britain Search Report dated Dec. 17, 2003.

(Continued)

*Primary Examiner*—Lana N. Le
(74) *Attorney, Agent, or Firm*—Whitham, Curtis, Christofferson & Cook, PC

(57) ABSTRACT

An image inputted from a camera input part 8 or the like is displayed on a display part 6 and converted through an analysis process such as latter recognition of the image in an image analysis part 7 to code data. A check is then made as to whether the code data obtained contains any identification code (or identification symbol or letter) registered in a memory 4, and data subsequent to each identification code is extracted and registered for each item in the data base. When the code data fails to contain identification code or data of each item, a key input part 9 edits the code data. Also, with data without any identification code, designation by cursor is made on display, and the data part is extracted and registered for the corresponding item.

18 Claims, 5 Drawing Sheets

U.S. PATENT DOCUMENTS

| | | | | |
|---|---|---|---|---|
| 2004/0204063 | A1* | 10/2004 | Van Erlach | 455/556.1 |
| 2005/0085263 | A1* | 4/2005 | Kim et al. | 455/556.1 |
| 2005/0140792 | A1* | 6/2005 | Hermsen | 348/231.2 |

FOREIGN PATENT DOCUMENTS

| | | |
|---|---|---|
| DE | 101 04 270 A 1 | 8/2001 |
| EP | 1 124 3638 | 2/2001 |
| JP | 06-181541 | 2/1994 |
| JP | 10-155038 | 6/1998 |
| JP | 10-175385 | 6/1998 |
| JP | 10-285565 | 10/1998 |
| JP | 11-313141 | 11/1999 |
| JP | 2000-004284 | 1/2000 |
| JP | 2000-032111 | 1/2000 |
| JP | 2001-175572 | 6/2001 |
| JP | 2001-177622 | 6/2001 |
| JP | 2001-243231 | 9/2001 |
| JP | 2002-152696 | 5/2002 |
| JP | 2002-027037 | 5/2007 |
| WO | WO 02/41241 A1 | 5/2002 |
| WO | WO 02/061670 A1 | 8/2002 |

OTHER PUBLICATIONS

United Kingdom Examination Report dated Nov. 21, 2005.
British Search Report dated May 20, 2004.
Japanese Office Action dated May 09, 2007 with English translation of relevant passages.

* cited by examiner

PORTABLE TELEPHONE SET

BACKGROUND OF THE INVENTION

This application claims benefit of Japanese Patent Application No. 2002-238580 filed on Aug. 19, 2002, the contents of which are incorporated by reference.

The present invention relates to portable telephone sets and, more particularly, portable telephone sets capable of automatically or semi-automatically inputting various data thereto.

Recent portable telephone sets have a function of collectively inputting data from a personal computer as a registering means, in which destination data of a telephone diary or the like are registered. Also, portable telephone sets are in a multiple function trend, and some portable telephone sets have an image input function such as an electronic camera for inputting image data so as to permit appropriately transmission of the image data to the opposite side of communication or the like.

Regarding a communication network (such as PHS), which is constituted by a center device and portable telephone sets connected to the network, Japanese Patent Laid-Open No. 7-236179 discloses a portable telephone set, to which a scanner for reading out letters or the like printed on a name card can be connected for transmitting image data of letters or the like read out by the scanner to the center device. The center device recognizes the image data, converts the same to letter/numeral data and transmits the converted data to a pertinent portable telephone set or the like. The pertinent portable telephone set registers the received letter/numeral data in the own data base.

The prior art portable telephone set is arranged to be capable of collectively reading out data from a personal computer or the like in a telephone diary or the like. In this case, however, this reading operation should be performed after starting the personal computer to edit files thereon. This function is convenient when registering a great deal of data at one time, but is extremely cumbersome when newly adding individual data. New additional data are often obtained by the name card or papers on which these data are written. These data are inputted through the key operations for each item in the telephone diary with watching these data. This operation, however, take a relatively lot of labor, thus posing a problem that it is difficult to make ready on-site registration. Besides, names or the like are often for unique reading, and sometimes "kana" input for conversion to Chinese characters at the time of the registration is different from "furigana", and subsequent editing of the furigana item is time-consuming. Furthermore, at present direct exchange of preserved data between terminals is impossible, and it is inevitable to use mails for the data exchange. This means that communication via the base station is necessary whenever data is exchanged.

In the portable telephone set disclosed in the above laid-open publication, image data is transmitted to the center device for requesting image recognition, and the portable telephone set itself need not have any letter recognizing function. However, even by making direct letter recognition of the image data, it is difficult to select data to be registered. Also, it is necessary to make communication via the base station or the like for registration of each data.

SUMMARY OF THE INVENTION

The present invention was made to solve the above problems, and its object is to provide a portable telephone set capable of automatically registering data from image data or code data in a data base via any base station or via a dialog type user interface.

According to an aspect of the present invention, there is provided a portable telephone set comprising an image input part for inputting image thereto from a camera or the like, an image analysis part for recognizing the image and converting the image to code data, a display part for displaying the code data, a key input part for additionally inputting, with respect to the output of the image analysis part, identification codes related to items to be registered or data of each item, a storing part for storing data for each item, and a control part for extracting data of each item from the code data based on the identification codes and registering the extracted data.

The portable telephone set permits preliminarily registering identification codes, and in which the control part extracts data subsequent to each identification code from the code data and registers the extracted data in the storing part for each item.

According to another aspect of the present invention, there is provided a portable telephone set comprising an image input part for inputting image thereto from a camera or the like, an image analysis part for recognizing the image and converting the image to code data, a display part for displaying the code data, a memory part for storing data of each item, a key input part for specifying code data displayed on the display part, and a control part for displaying an instruction for specifying data to be registered for each item on the display part, extracting, in response to cursor specification of data to be registered by the key input part, the specified data part, and registering the extracted data part as data of each item in the storing part.

Image transferred from a different portable telephone set is inputted to the image input part. The data form of the image is JPEG.

According to other aspect of the present invention, there is provided a portable telephone set comprising a receiving input part for inputting to code data transferred from a different portable telephone set or the like, a display part for displaying code data, a key input part for additionally inputting to the same identification codes related to items to be registered with respect to the code data or data of each item, a storing part for storing the data of each item, and a control part for extracting the data of each item from the code data based on each identification code and registering the extracted data in the storing part.

The portable telephone set permits preliminarily registering identification codes, and in which the control part extracts data subsequent to registered identification codes from the code data and registers the extracted data for each item in the storing part.

According to still other aspect of the present invention, there is provided a portable telephone set comprising a receiving input part for inputting to the same code data transferred from a different portable telephone set, a display part for displaying code data, a storing part for storing data of each item, a key input part for specifying code data displayed on the display part, and a control part for displaying an instruction for specifying data to be registered for each item on the display part, extracting, in response to cursor specification of data to be registered in the key input part, the specified data part, and registering the extracted data part as the data of each item in the storing part.

The data form of the transferred code data is a text or bar code form. The control part displays reserved data on the display part, and has a control function of transferring the displayed data on a different portable telephone set and a control function of receiving the data transferred from a different portable telephone set. The transfer of data to the different portable telephone set is made by infrared communication, bluetooth or like wireless communication or wired communication via connector. The data of each item is data of a telephone set or a scheduler.

Specifically, an image inputted from a camera input part is displayed on the display part and is also fed to the image analysis part, which executes an analysis process such as letter recognition on the image for conversion thereof to code data, a check is then made as to whether the code data contains any identification code (i.e., identification symbol or letter) preliminarily registered in the memory, and data subsequent to each identification code is extracted and registered in the data base for each item. When the code data fails to contain any identification code for data of each item, the key input part edits the code data. Even with data without identification code, the data part is extracted by cursor specifying it on the display and is registered in the corresponding item. Input image or code data received from a different portable telephone set are registered likewise. To this end, the portable telephone set has a function of transferring the sole image or data displayed on the receiving display part and also a function of receiving such image or data, and utilizes an IR (infrared) communication function, wireless communication such as bluetooth and wireless communication via connector.

Other objects and features will be clarified from the following description with reference to attached drawings.

PREFERRED EMBODIMENTS OF THE INVENTION

Preferred embodiments of the present invention will now be described with reference to the drawings.

First Embodiment

Figure 1:
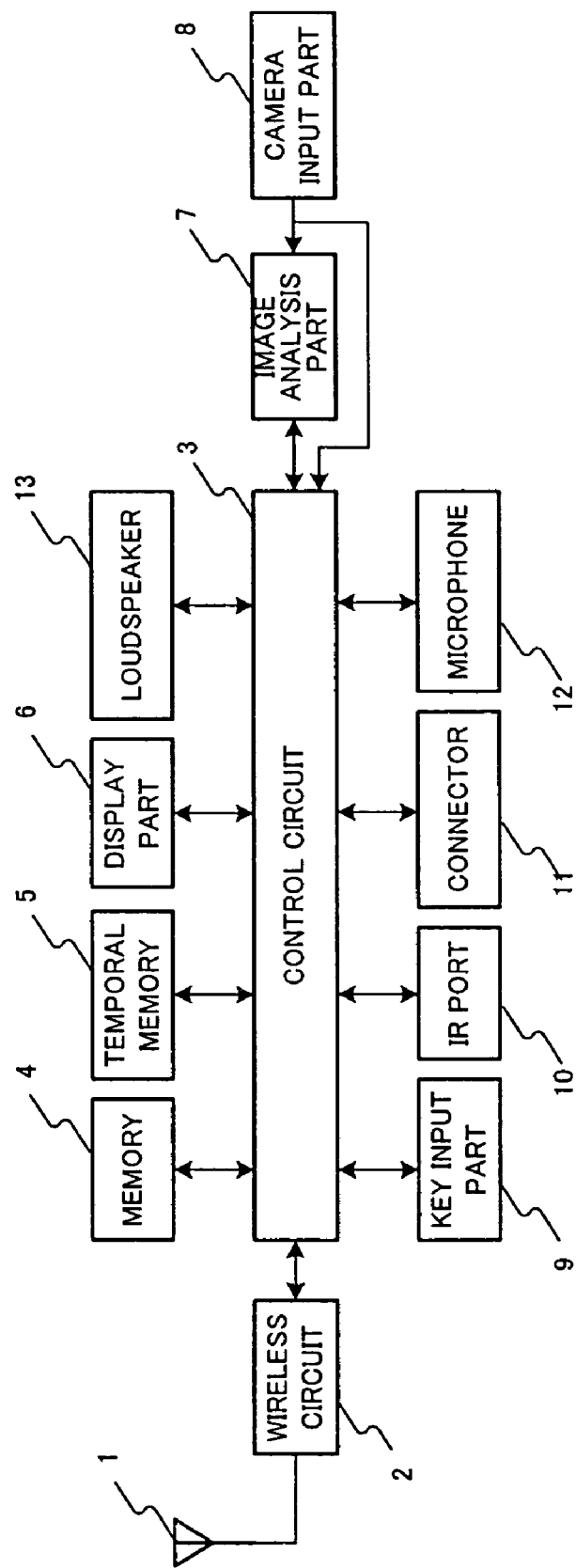
FIG. 1 is a basic block diagram showing a first embodiment of the portable telephone set according to the present invention.

FIG. 1 is a basic block diagram showing a first embodiment of the portable telephone set according to the present invention. This embodiment of the portable telephone set according to the present invention comprises an antenna 1, a radio circuit 2, a control circuit 3, a memory 4, a temporary memory 5, a display part 6, an image analysis part 7, a camera input part 8, a key input part 9, an IR port 10, a connector 11, a microphone 12 and a loudspeaker 13.

In summary of the first embodiment, images inputted from the camera input part 8 are displayed on the display part 6 and stored in the temporary memory 5. The image analysis part 7 analyzes the images stored in the temporary memory 5. The control circuit 3 checks whether any discrimination code (i.e., discrimination symbol or letter) corresponding to an item of data base preliminarily registered in the memory 4 is present among the data obtained by the analysis. When such a code is present, the image analysis part 7 automatically registers data subsequent to the identification code. The functions of the various parts will now be described.

The antenna 1 and the wireless circuit 2 provide functions of communication and communication control between the portable telephone set and the base station. The microphone 12 and the loudspeaker 13 provide functions of transmitting and receiving voice signals in the communication noted above. In the memory 4 are stored programs for realizing functions of this embodiment of the portable telephone set, and the memory 4 has a function of storing images picked up by the camera, images inputted from a different portable telephone set or the like, image analysis data, letter recognition result data (i.e., code data) and data bases for name cards, schedules, etc. The temporary memory 5 temporarily stores images, code data and various function data, and the display part 6 provides a function of displaying the contents of data stored in the temporary memory 5.

The camera input part 8, like an electronic camera mounted on a portable telephone set, can pick up given images with user's operation. The image analysis part 7 has functions of receiving picked-up images inputted from the electronic camera and converting image data through image analysis such as letter recognition to code data.

The key input part 9 has functions of selection of picking up images, registering identification codes (i.e., identification symbols or letters) or the like in the memory 4 and adding and correcting letters with respect to displayed data on the display part 5, in addition to usual control functions of the portable telephone set, for instance the selection of various functions such as inputting telephone numbers, transmitting calls, receiving calls, on-off hook function, setting various menus and display operations. The IR port 10 is a transmitting/receiving port for infrared communication, in which images or code data or the like are directly transmitted to and received from a different portable telephone set or the like. The connector 11 is an external connection terminal for wired line communication.

The control circuit 3 provides a function of data transfer among the individual parts, as well as such functions as of process control for storing the output of the camera input part 8 in the memory 4, process control for such process as letter recognition of the same output in the image analysis part 7, process control for displaying data stored in the temporary memory 5 in the display part 5, process control, responsive to operations of the key input part 9, to edit code data displayed on the display part 6, process control for transferring stored in the memory 4 or the temporary memory 5 via the IR port, the connector 11 and the bluetooth and process control for retrieving an identification code from code data for registration of the retrieved data in the memory 4, from which data subsequent to the identification code has been extracted.

Figure 2:
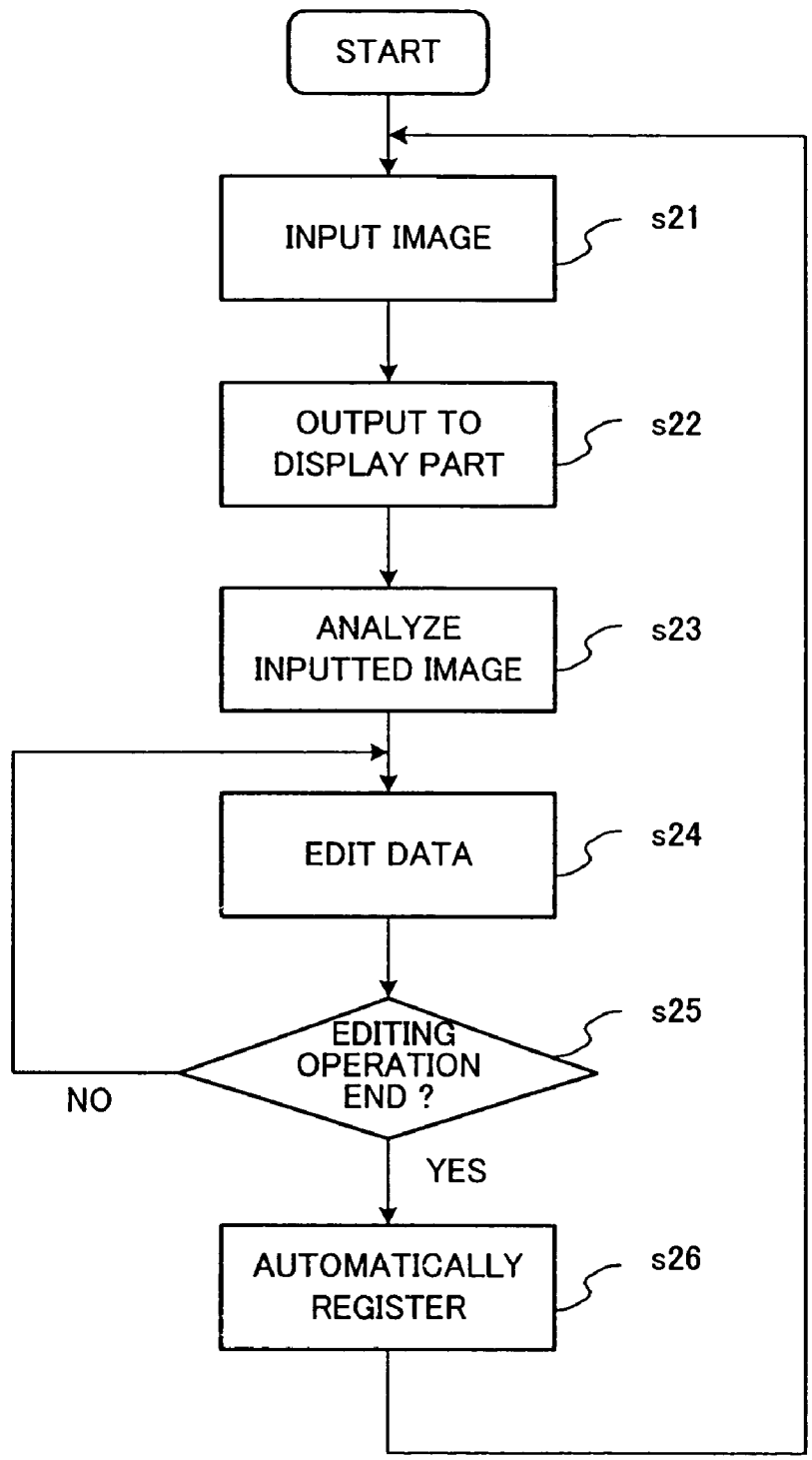
FIG. 2 is a view showing a flow chart illustrating the operation routine in the first embodiment.

FIG. 2 is a view showing a flow chart illustrating the operation routine in the first embodiment. This embodiment concerns a portable telephone set capable of automatic registration of individual data concerning a telephone diary.

In the memory 4 of the portable telephone set, "names", "furiganas", "TELs" and "E-mails" are preliminarily registered as identification codes related items of the telephone diary. In the initial state (START), image input is waited, and the user inputs an image obtained by picking a name card or the like with individual data entered therein with the camera input part 8 of the portable telephone set (step s21). The control circuit 3 feeds the inputted image (i.e., input image) to the display part 6 for display thereon (step s22), and also feeds to the image analysis part 7. The image analysis part 7 (analyzes the input image for conversion thereof to code data (for instance text data) to be outputted (step s23). The control circuit 3 stores the code data in the temporary memory 5 and also causes the same code data to be displayed on the display part 6.

Then, the user repeatedly executes data edition such that when there is any identification code to be supplemented concerning the analysis result code data displayed on the display part 6, he or she additionally provides that identification data in front of the corresponding data by input operation of the key input part 9, and when there is any data or the like to be supplemented among the individual data concerning a telephone diary item, he or she also additionally provides that data or the like (i.e., data or the like corresponding to identification code) (steps s24 and s25).

When the user instructs the end of the editing operation by operating an end button in the key input part 6 (step s25), the control circuit 3 extracts, based on an identification code preliminarily registered in the memory 4, data subsequent to that identification code among the code data obtained after the data edition, the extracted data being automatically registered in a corresponding place in the memory 4 for each telephone diary item (step a26). The routine then goes back to state (i.e., step s21) of waiting the next image input.

In this embodiment, the camera input part 8 takes out an image of, for instance, a name card on which individual data is printed, and the image analysis part 7 does image analysis, such as letter recognition, of the taken-out image. Then, the retrieval is performed by using the identification code and the corresponding data is registered. Also, when the name card has no data necessary for the registration of a telephone diary item, such as "furigana" or identification code, it is a suitable method to enter the necessary data by hand-writing on the name card before taking out the image with the camera input part 8. In this case, the image analysis part 7 recognizes and analyzes the hand-written letters as well, thus making it unnecessary that the user makes any data editing operation with the key input part 9.

The first embodiment has been arranged such that the corresponding data part data is selected for each telephone diary item by utilizing the identification code. In a second embodiment, a method is adopted, in which no identification code is used for the selection of the data obtained after the image analysis, but a corresponding part for each telephone diary item among the image data, which have been obtained in the camera input part 8 and displayed on the display part 6, is cursor designated from the key input part 9 or the like and registered.

Second Embodiment

The second embodiment is similar to arrangement of the portable telephone set as shown in FIG. 1, except for that the control circuit 3 has a function of progressively displaying the identification codes (i.e., identification symbols or letters), such as "names", "furiganas", "TELs" and "E-mails" which have been preliminarily stored in the memory 4, thus persuading the user to select the data part of each item, and also a registering function of extracting the data parts selected responsive to the operation of the key input part 9 by the user and storing the extracted data parts in pertinent item places of the memory 4. In other words, the control circuit 3 has a function of independently registering the data having been directly cursor designated by the user among the code data or data in places having been additionally designated in the editing. It is thus not necessary to add and edit any identification code which has not been provided from the key input part 9.

Figure 3:
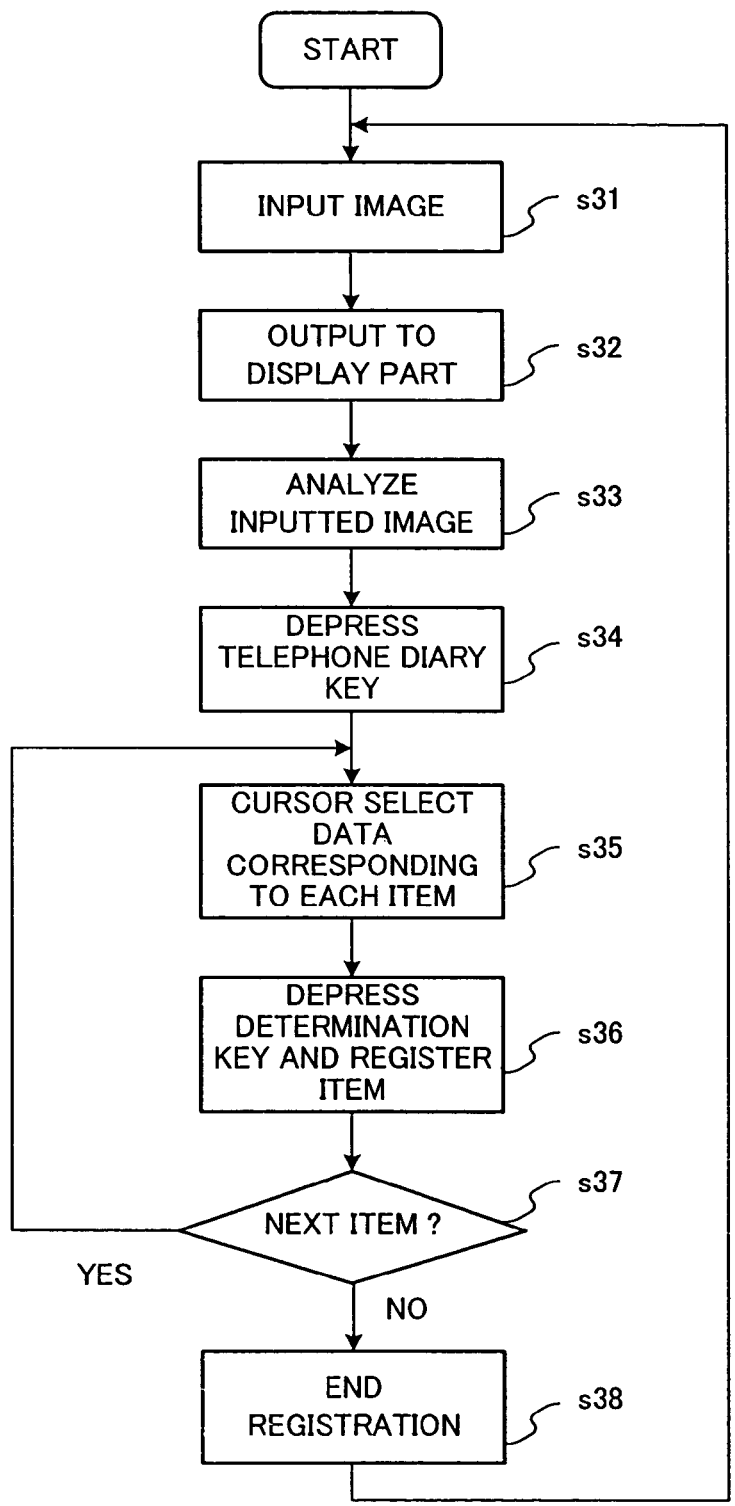
FIG. 3 is a flow chart illustrating the operation routine executed in the second embodiment.

FIG. 3 is a flow chart illustrating the operation routine executed in the second embodiment. In the second embodiment, in a state that image has been inputted and displayed on the display part 6 (steps s31 and s32) and also that code data (for instance text data) having been obtained after image analysis on the image analysis part 7 also has been displayed on the display part 6 (step s33), a telephone diary registration mode is set up by depressing a telephone diary key in the key input part 9 (step s34). In the telephone diary registration mode, the first item title, for instance "name ?" of the telephone diary to be inputted, is additionally displayed on the display part 6, and display data corresponding to the item (i.e., "name") is cursor selected by the user's operation (step s35). Subsequently, the next item, for instance "furigana ?") is displayed on the display part 6 (step s37). The registration is repeated by executing like operations of selection and determination (steps s35 to s37). When all the items to be registered have been selected and depressing a determination button, an end is brought to the name registration operation (step s38), and the routine goes back to the initial state (START) of waiting telephone diary registration concerning the next name.

In lieu of this embodiment, it is also possible to provide such a process function that, the control circuit 3 automatically extracts and registers data, in which identification code (i.e., identification symbol or letter) is present in code data, while as to data without identification code therein it persuades the user to select a data part of each item and directly register the data in cursor designated place with neither addition nor correction of any identification code.

Third Embodiment

A third embodiment will now be described, which is a portable telephone set having the arrangement of the first embodiment shown in FIG. 1. In this embodiment, concerning the FIG. 2 steps s21 and s22 of image input and display, a different portable telephone set is adopted to receive, via the IR port 10 of the own portable telephone set, image or the like, which is displayed on the display part 6 and transmitted by an IR (infrared) communication function. Subsequently, as in the first embodiment, the received image can be converted through image analysis to code data and then registered in the memory 4.

In this case, preferably the control circuit 3 of each portable telephone set has a function of temporarily storing the image data in the temporary memory 5 and limitatively transmitting the sole data displayed on the display part 5 and a function of receiving that data. The coding system of image (i.e., still image), is a compression/de-compression system permitting data compression shown to $\frac{1}{10}$ to $\frac{1}{100}$, and by arranging such as to permit use of a usual image format of compact full size such as JPEG, mutual data transfer between the portable telephone sets can be made even in the case when the different portable telephone set of a different model.

The process operations after the data input by transfer and display in this embodiment, are the same as the process operations of the data recognition (step s23), the data edition (steps s24 and s25) and the automatic registration (step s26) in the image analysis part shown in FIG. 2.

Fourth Embodiment

A fourth embodiment will now be described, which is a portable telephone set having the same arrangement as shown in FIG. 1 concerning the second embodiment. In this embodiment, concerning the FIG. 3 steps s31 and s32 of the image input and display, image or the like, which is displayed on the display part 7 of a different portable telephone set and transmitted by the IR communication function, is received via the IR port 10 of the own portable telephone set. Subsequently, as in the second embodiment, the received image or the like is converted through image analysis to code data and then registered in the memory 4.

In this case, preferably the control circuit 3 of each portable telephone set has a function of temporarily storing the image data in the temporary memory 5 and limitatively transmitting the sole data displayed on the display part 5 and a function of receiving that data. By arranging such that a usual image format such as JPEG can be dealt with as the image form, mutual data transfer between the portable telephone sets can be made even when the portable telephone set is of a different model.

The process operations after the data input by transfer and the display in this embodiment, are the same as the process operations of the data recognition (step s33) in the image analysis part 7, the telephone diary key depression (step s34) and the registration of item data (step s38) by cursor selection of data part and determination key depression (steps s35 to s37) as shown in FIG. 3.

Fifth Embodiment

Figure 4:
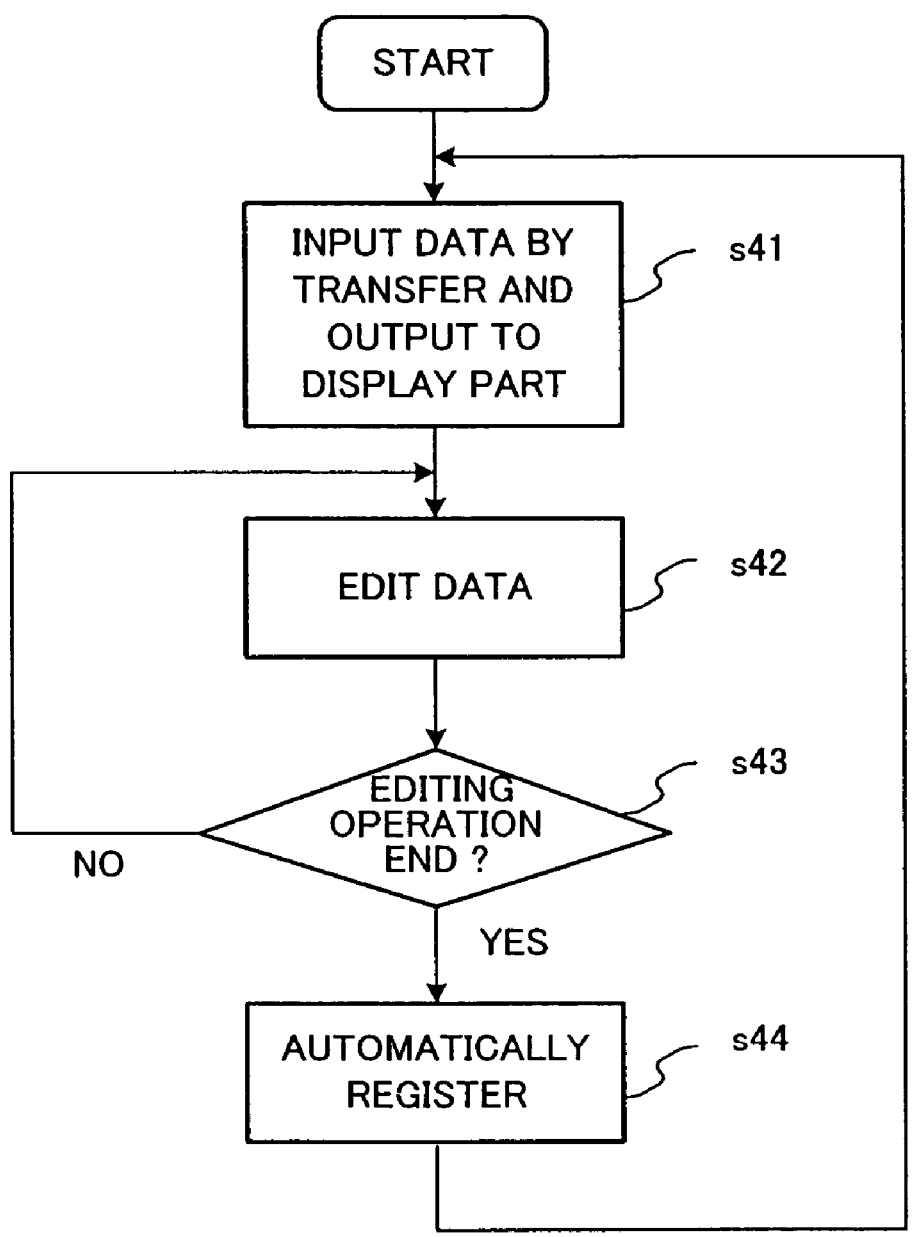
FIG. 4 is a flow chart illustrating the operation routine of a fifth embodiment of the present invention.

FIG. 4 is a flow chart illustrating the operation routine of a fifth embodiment of the present invention. This embodiment is arranged such that the transferred data in the third embodiment is constituted by code data (for instance text data) preliminarily registered in the memory 4 of a different portable telephone set. Also, of the code data that have been stored in the memory 4 the sole data displayed on the display part 6 is stored in the temporary memory 5 and transferred. Furthermore, by providing for identity of the form of the code data preliminarily stored in the memory 4 or allowing transfer between sets of the same model, compared to the image system case the quantity of data dealt with is reduced, reducing the transfer time and the power consumption.

As shown in FIG. 4, the process operations of the data editing (steps s42 and s43) subsequent to the display of data inputted by transfer (step s41) and the automatic registration (step s44), are the same as the process operations described before in detail in connection with the first (or third) embodiment.

Sixth Embodiment

Figure 5:
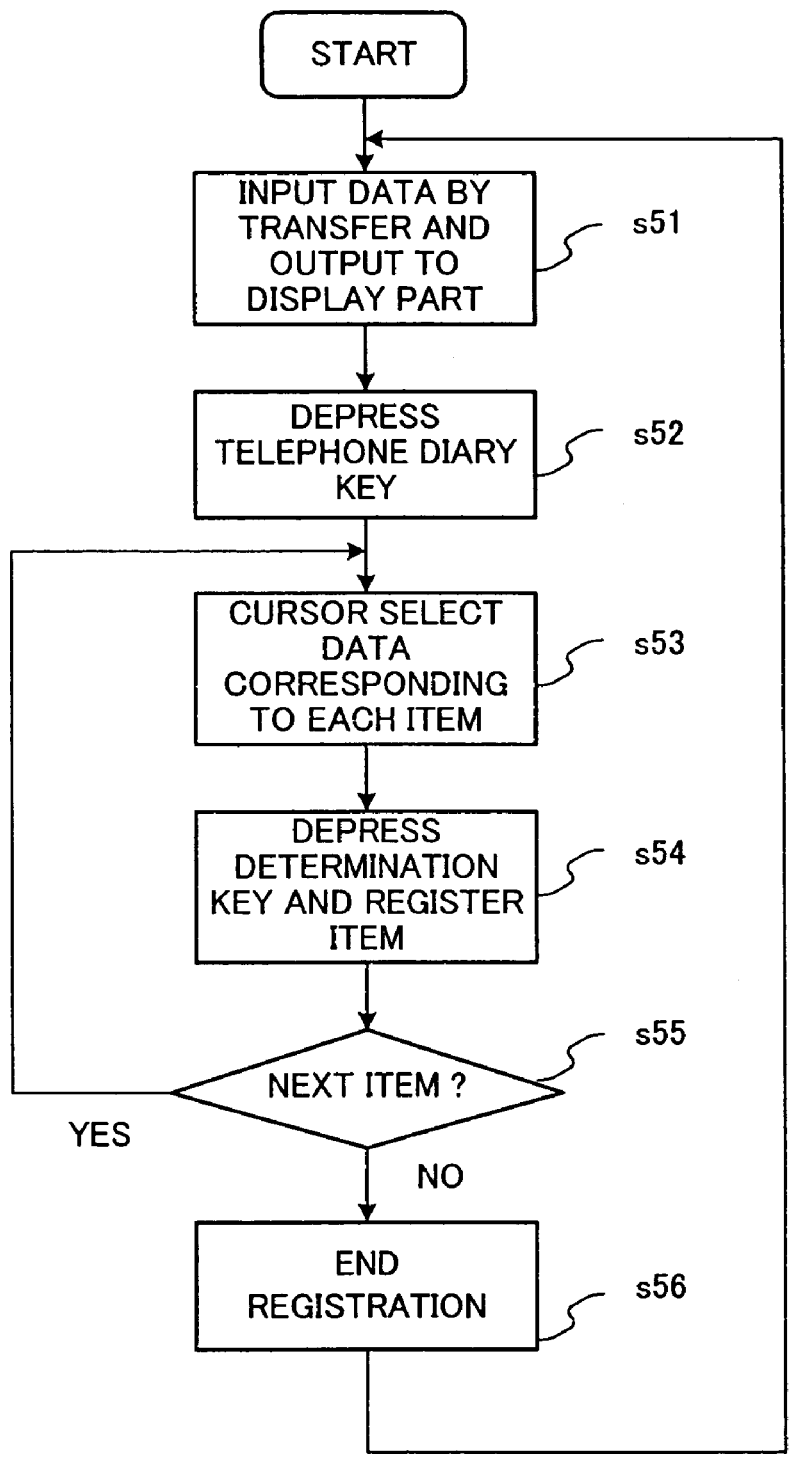
FIG. 5 is a flow chart illustrating the operation routine of a sixth embodiment of the present invention.

FIG. 5 is a flow chart illustrating the operation routine of a sixth embodiment of the present invention. In this embodiment, the transferred data in the fourth embodiment are constituted by code data (for instance text data) which have been preliminarily registered in the memory 4 of a different portable telephone set. Also, of the code data having been stored in the memory 4 the sole data displayed on the display part 6 is stored in the temporary memory 5 and transferred. Furthermore, by providing for identity of the form of the code data preliminarily stored in the memory 4 or allowing transfer between sets of the same model, compared to the image system case the quantity of data dealt with is reduced, reducing the transfer time and the power consumption.

As shown in FIG. 5, the process operations of the telephone diary key depression (step s52) after the display of data inputted by the transfer (step s51), cursor selection of data part and determination key depression (steps s53 to s55) are the same as the process operations described before in detail in connection with the first (or third) embodiment.

OTHER EMBODIMENT

In the above embodiments, in the case of dealing with data transferred between sets of the same model, it is possible to use bar codes as a form of data in the data transfer to provide for improved confidential property. It is possible to make data being dealt with confidential to the third party by such means as adopting a bar code form of the data displayed on the display part.

Also, in the case of dealing with transferred data, it is possible to utilize wired communication via the connector 11 as communication means. Furthermore, as a method of transferring images or the like with respect to a different portable telephone set, wireless transfer in the portable telephone set shown in FIG. 1 is possible by adding a bluetooth module or substitution of the bluetooth module in the connector 11.

While the above embodiments have concerned with the case of dealing with individual data of name cards or the like, it is also possible to provide such an arrangement as to deal with data other than the individual data. For example, in the case of dealing with data concerning scheduler, in the case of, for instance, the first embodiment "time", "place", etc., are preliminarily registered as identification codes (i.e., identification symbols or letters). By increasing the kinds of identification codes to be preliminarily registered, it is possible to also increase the kinds of data that can be dealt with. This method permits such data as contents individually registered by the user and call arrival display melody data (call arrival melody) as well as data transferred between portable telephone sets. Again in this case, it is possible to prevent erroneous transfer by limiting the data transferred between the portable telephone sets to the data displayed on the display part 6.

According to the present invention, image of individual data or the like, inputted from a camera or like image input part, can be analyzed by image analysis and readily registered automatically or via a dialog type user interface in a telephone diary or like database with cursor designation of the places of registration. Thus, the operability of data input to the portable telephone set can be improved. In the automatic registration, it is possible to build a desired data base by preliminarily registering identification codes corresponding to data base items.

Furthermore, it is possible to readily build up a database from image or text data transferred from a different telephone set. Also, it is possible to permit ready transfer without agency of any base station or the like by utilizing infrared communication, bluetooth, etc., as a transfer means. Also, by limiting the data dealt with to the data displayed on the display part, the user can readily know what is dealt with and prevent erroneous operation concerning other data.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A portable telephone set comprising:
   an image input part for receiving an image thereto from a camera or the like, an image analysis part for recognizing the image and converting the image to code data,
   a display part for displaying the code data,
   a key input part for additionally inputting, with respect to an output of the image analysis part, identification codes related to item to be registered or data of each item,
   a storing part for storing data for each item, and a control part for extracting data of each item from the code data based on the identification codes and registering the extracted data, wherein said control part is constructed and arranged to provide selective preliminarily registering of identification codes, and wherein said extracting extracts data subsequent to each identification code from the code data and registers the extracted data in the storing part for each item.

2. The portable telephone set according to claim 1, wherein image transferred from a different portable telephone set is received by the image input part.

3. The portable telephone set according to claim 1, wherein the data form of the image is JPEG.

4. The portable telephone set according to claim 1, wherein the control part displays reserved data on the display part, and has a control function of transferring the displayed data to a different telephone set and a control function of receiving the data transferred from a different portable telephone set.

5. The portable telephone set according to claim 4, wherein the transfer of data to the different portable telephone set is made by infrared communication, Bluetooth or wireless communication or wired communication via connector.

6. The portable telephone set according to claim 1, wherein the data of each item is data of a telephone set or scheduler.

7. A portable telephone set comprising:
   an image input part for receiving an image,
   an image analysis part for recognizing the image and converting the image to code data,
   a display part for displaying the code data
   a memory part for storing data of each item,
   a key input part for specifying code data displayed on the display part, and
   a control part for displaying an instruction or specifying data to be registered for each item on the display part, extracting, in response to cursor specification of data to be registered by the key input part, the specified data part, and registering the extracted data part as data of each item in the storing part.

8. The portable telephone set according to claim 7, wherein the control part displays reserved data on the display part, and has a control function of transferring the displayed data on a different telephone set and a control function of receiving the data transferred from a different portable telephone set.

9. The portable telephone set according to claim 7, wherein the data of each item is data of a telephone set or scheduler.

10. The portable telephone set according to claim 7, wherein image transferred from a different portable telephone set is received by the image input part.

11. The portable telephone set according to claim 7, wherein the data form of the image is JPEG.

12. A portable telephone set comprising:
    a receiving part for receiving code data transferred from a different portable telephone set,
    a display part for displaying code data,
    a key input part for additionally inputting to the same identification codes related to items to be registered with respect to the code data or data of each item,
    a storing part for storing the data of each item, and
    a control part for extracting the data of each item from the code data based on each identification code and registering the extracted data in the storing part, wherein said control part is constructed and arranged to provide selective preliminarily registering of identification codes, and wherein said extracting extracts data subsequent to each identification code from the code data and registers the extracted data in the storing part for each item.

13. The portable telephone according to claim 12, wherein the data form of the transferred code data is a text or bar code form.

14. The portable telephone set according to claim 12, wherein the control part displays reserved data on the display part, and has a control function of transferring the displayed data on a different telephone set and a control function of receiving the data transferred from a different portable telephone set.

15. The portable telephone set according to claim 12, wherein the data of each item is data of a telephone set or scheduler.

16. A portable telephone set comprising:
    a receiving input part for receiving the code data transferred from a different portable telephone set,
    a display part for displaying code data,
    a storing part for storing data of each item,
    a key input part for specifying code data displayed on the display part, and
    a control part for
       displaying an instruction for specifying data to be registered for each item on the display part,
       extracting, in response to cursor specification of data to be registered in the key input part, the specified data part, and
       registering the extracted data part as the data of each item in the storing part.

17. The portable telephone set according to claim 16, wherein the control part displays reserved data on the display part, and has a control function of transferring the displayed data on a different telephone set and a control function of receiving the data transferred from a different portable telephone set.

18. The portable telephone set according to claim 16, wherein the data of each item is data of a telephone set or scheduler.

* * * * *